United States Patent
Krummell, Jr.

[19]

[11] Patent Number: 6,129,223
[45] Date of Patent: *Oct. 10, 2000

[54] PUSH-BACK CART STORAGE SYSTEM

[76] Inventor: John V. R. Krummell, Jr., 5702 Bolsa Ave., Huntington Beach, Calif. 92649

[ * ] Notice: This patent issued on a continued prosecution application filed under 37 CFR 1.53(d), and is subject to the twenty year patent term provisions of 35 U.S.C. 154(a)(2).

[21] Appl. No.: 09/085,660

[22] Filed: May 28, 1998

[51] Int. Cl.[7] .......................................................... A47F 1/04
[52] U.S. Cl. .......................... 211/151; 211/59.2; 414/276
[58] Field of Search ................................... 211/151, 162, 211/59.2; 414/276, 286; 193/35 R; 312/198–201

[56] References Cited

U.S. PATENT DOCUMENTS

| | | | |
|---|---|---|---|
| 4,341,313 | 7/1982 | Doring . | |
| 4,462,500 | 7/1984 | Konstant et al. | 211/151 |
| 4,687,404 | 8/1987 | Seiz et al. | 211/151 |
| 4,771,901 | 9/1988 | Griswold et al. | 211/151 |
| 4,915,240 | 4/1990 | Konstant | 211/151 |
| 5,064,335 | 11/1991 | Bergeron et al. | 211/151 X |
| 5,080,241 | 1/1992 | Konstant | 211/151 |
| 5,137,159 | 8/1992 | Collins et al. | 211/151 |
| 5,141,118 | 8/1992 | Gay | 211/151 |
| 5,180,069 | 1/1993 | Krummell et al. . | |
| 5,203,464 | 4/1993 | Allen | 211/151 |
| 5,316,157 | 5/1994 | Konstant | 211/151 |
| 5,328,038 | 7/1994 | Allen | 211/151 |
| 5,348,169 | 9/1994 | Allen | 211/151 |
| 5,393,188 | 2/1995 | Scott et al. | 414/276 |
| 5,415,300 | 5/1995 | Krummell et al. | 211/151 |
| 5,419,444 | 5/1995 | Strom | 211/151 |
| 5,476,180 | 12/1995 | Konstant | 211/151 |
| 5,598,934 | 2/1997 | Krummell et al. . | |
| 5,617,961 | 4/1997 | Konstant et al. | 211/151 |
| 5,641,082 | 6/1997 | Grainger | 211/151 |

*Primary Examiner*—Daniel P. Stodola
*Assistant Examiner*—Jennifer E. Novosad
*Attorney, Agent, or Firm*—Lyon & Lyon LLP

[57] ABSTRACT

A push-back rack storage system has a pair of spaced apart rack rails having lower outside rail flanges. A first cart has front and back wheels which roll on the lower outside rail flanges. A second cart has front wheels which roll on outside rail flanges on side rails of the first cart. The back wheels of the second cart roll on the lower rail flanges of the rack rails. A third cart has front wheels which roll on outside rail flanges of side rails of the second cart. The back wheels of the third cart roll on the lower rail flanges of the rack rails. The carts may be provided with a strut deck, a solid deck, or a wire mesh deck, without interfering with rolling operation of the carts.

3 Claims, 5 Drawing Sheets

PUSH-BACK CART STORAGE SYSTEM

BACKGROUND OF THE INVENTION

The field of the invention is push-back cart storage systems.

Push-back cart storage systems typically use rolling carts for carrying pallets or other cargo, on slightly inclined rails. By providing several carts on a set of rails, usable space between aisles in, e.g., a warehouse is increased, as multiple pallets can be stored and retrieved from a single aisle. Consequently, aisle space necessary in conventional storage racks for forklift access may instead be used for additional storage racks, providing more efficient use of space. Various push-back cart storage systems have been successfully used in the past, as described, for example, in U.S. Pat. No. 5,415,300, and 5,598,934. The invention provides an improved design over these and other known push-back cart storage systems.

SUMMARY OF THE INVENTION

To these ends, a push-back rack storage system includes a pair of spaced apart rack rails, each having a lower outer rail flange. A first cart has a pair of spaced apart cart side rails, with the side rails having lower outer rail flanges. Front and back wheels of the cart are supported on the lower outer rail flanges of the rack rails.

Preferably, a second cart is provided and also has spaced apart cart side rails with lower outside cart rail flanges. The front wheels of the second cart are advantageously supported on the lower outside cart side rail flanges, while the rear wheels of the second cart are preferably supported on the lower outer rail flanges of the rack rails. In a similar way, a third cart is preferably provided, with the front wheels of the third cart supported and rolling on the lower outside cart side rail flanges, and the back wheels of the third cart supported on the lower outer rail flanges of the rack rails. As the third cart preferably rolls over the second cart, and the second cart rolls over the first cart, the top deck of each cart can be provided with a solid metal deck plate, or a wire mesh, allowing the storage system to store more different kinds of pallets or loads. Additional carts may be added.

Accordingly, it is an object of the invention to provide an improved push-back cart storage system. Other and further objects and advantages will appear hereinafter.

BRIEF DESCRIPTION OF THE DRAWINGS

In the drawings, wherein similar reference characters denote similar elements throughout the several views.

DETAILED DESCRIPTION OF THE PREFERRED EMBODIMENTS

Figure 1:
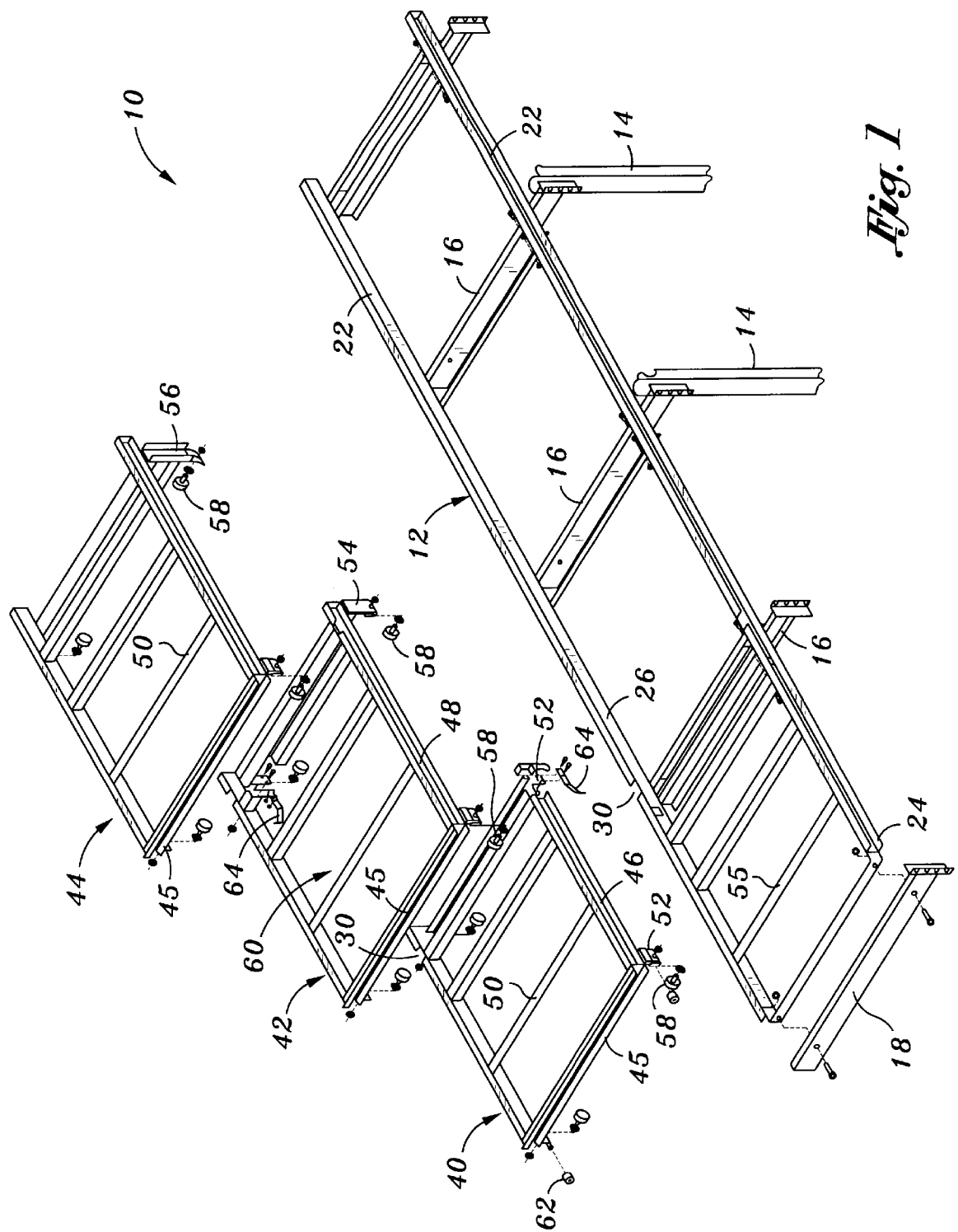
FIG. 1 is an exploded perspective view of the present push-back rack storage system.
Figure 2:
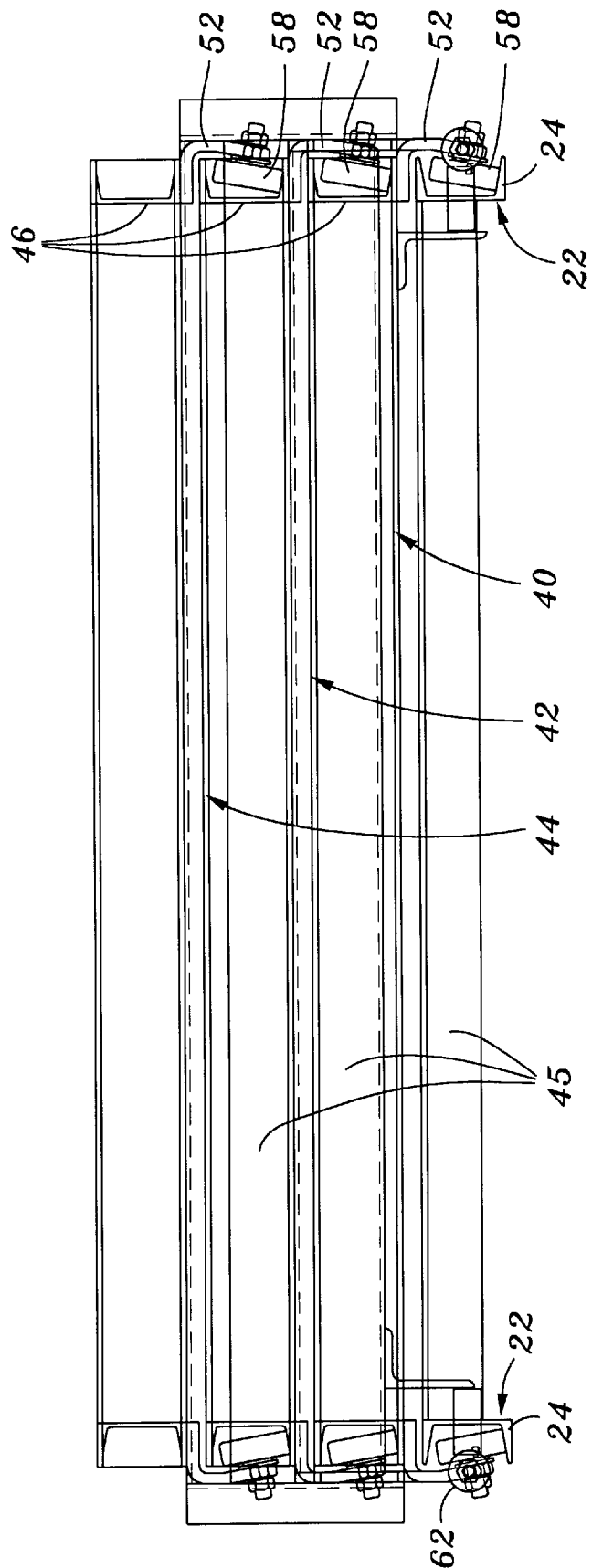
FIG. 2 is a front view thereof.

Turning now in detail to the drawings, as shown in FIG. 1, the present storage rack assembly 10 includes a rack 12 supported on vertical posts 14. The rack 12 includes rack rails 22 supported on and attached to cross bars 16. The vertical posts 14 are attached to the floor. Although only a single rack 12 is shown, in typical applications, several racks 12 will be vertically stacked up, one above the other, on the vertical posts 14. A front load beam 18 is attached to the front end of the rack 12, and to vertical posts (not shown).

In the embodiment shown in FIG. 1, a first cart 40, a second cart 42, and a third cart 44 are provided. The first cart 40 includes a cart front rail 45 and cart side rails 46 attached to the cart front rail 45, and to each other via cross members 50.

Referring to FIGS. 1–4, first wheel arms 52 on the first cart 40 extend out and around the rack rails 22. Wheels 58 rotatably attached to the first wheel arms 52 roll on the lower outside rail flange 24 of the rack rails 22, at the front and back ends of the first cart 40.

Figure 3:
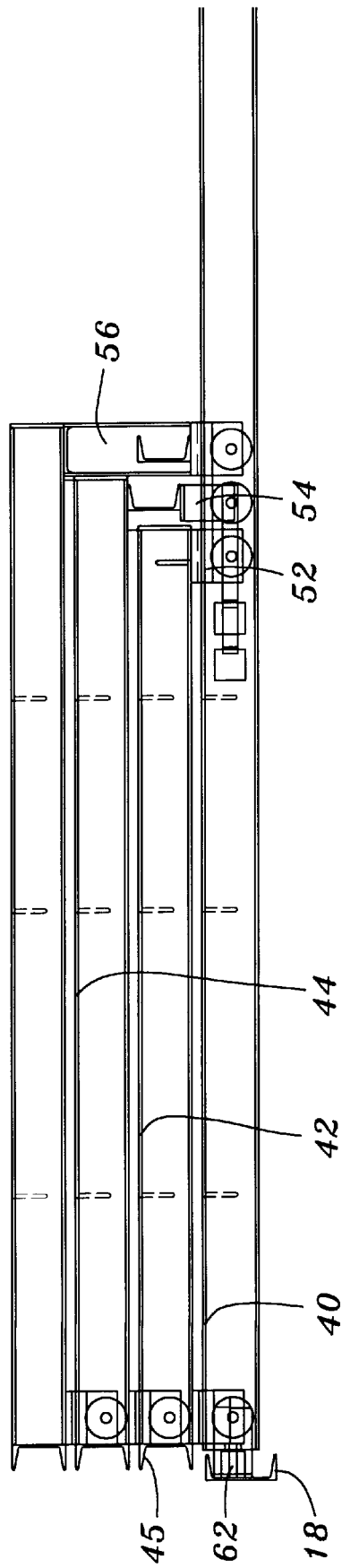
FIG. 3 is a side view thereof.

The second cart 42 has a design similar to the first cart 40, except that the rear wheels 58 of the second cart 42 are supported on second wheel arms 54, which are taller than the first wheel arms 52, so that the second cart 42 can telescope or roll over the first cart 40, with the rear wheels 58 of the second cart 42 rolling on the lower outside rail flange 24 of the rack rails 22. The front wheels 58 of the second cart 42 roll on the lower cart rail flanges 48 of the cart side rails 46 of the first cart 40. As shown in FIG. 3, the second cart 42 is longer than the first cart 40, to allow the second wheel arm 54 to extend downwardly behind the first cart 40.

The third cart 44 is similar to the first cart 40 and the second cart 42, except that the rear wheels 58 of the third cart 44 are rotatably attached to third wheel arms 56, which as shown in FIG. 3, are taller than the first and second wheel arms 52 and 54. The third cart 44 is also longer than the second cart 42, as shown in FIG. 3, so that the third cart 44 can move over the second cart 42.

Top surface wheel cutouts 30 are provided in the rack rails 22 and in the cart side rails 46 in the first cart 40 and second cart 42, to allow the carts to be placed on the rack rails and each other, as shown in the figures.

Figure 4:
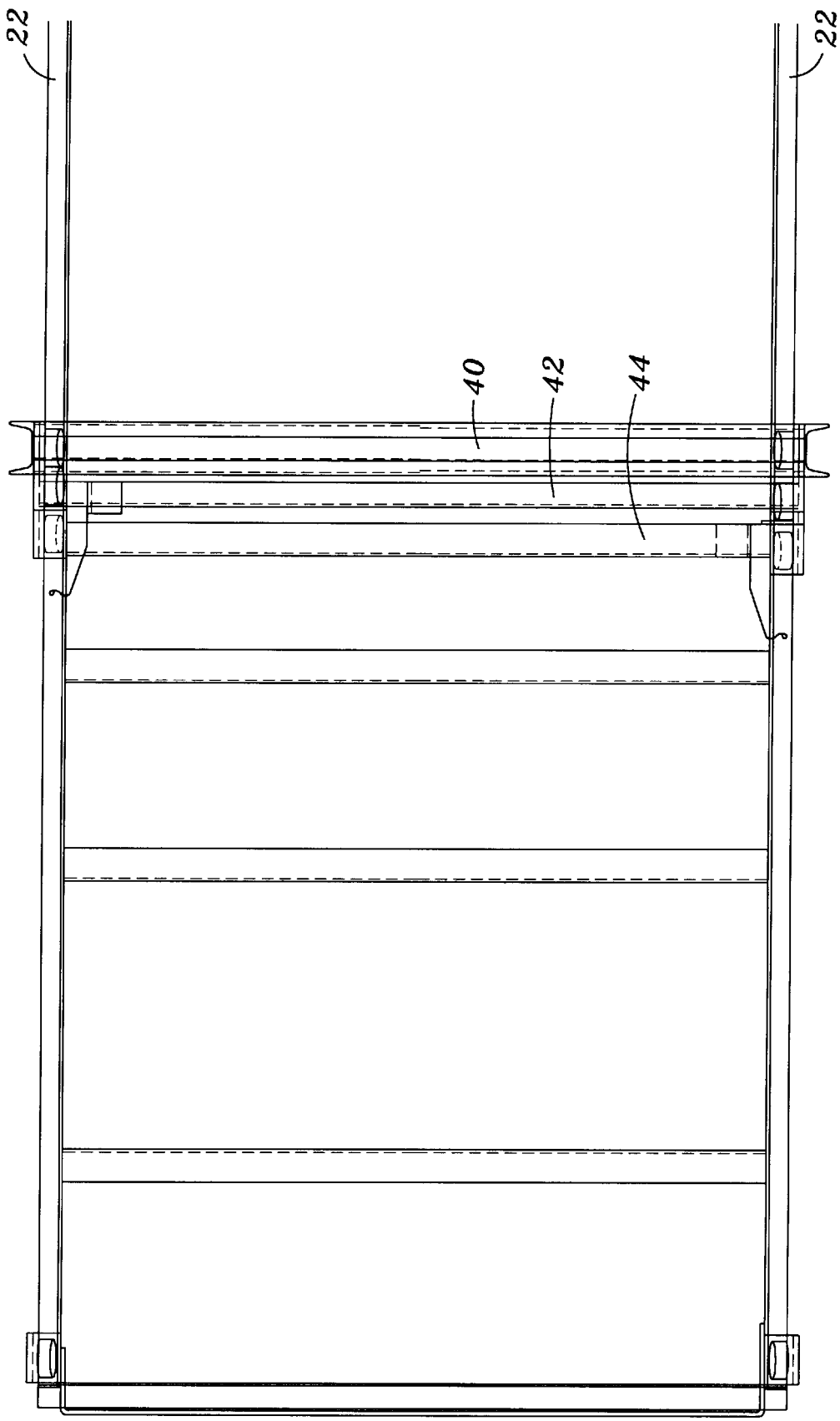
FIG. 4 is a plan view thereof.
Figure 5:
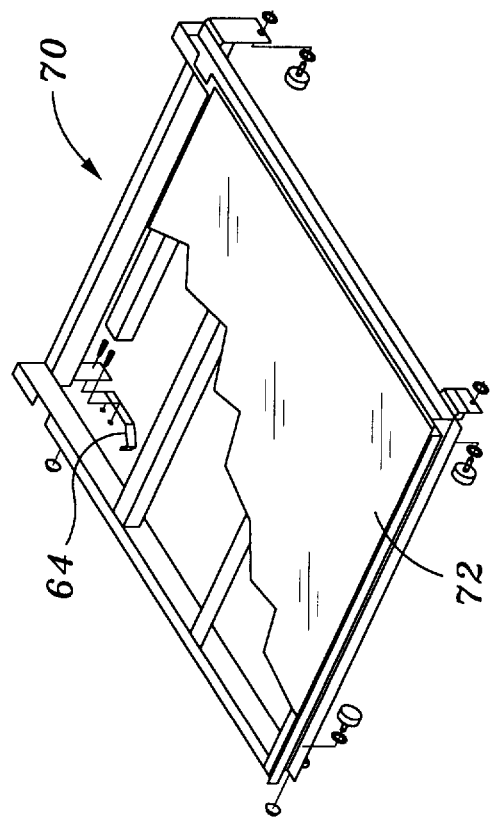
FIG. 5 is a perspective view of a cart embodiment having a solid and continuous top deck plate.

As best shown in FIGS. 1, 4 and 5, a latch spring 64 is provided on the carts to prevent them from inadvertently moving due to rolling wheel friction of another cart, as described in U.S. Pat. No. 5,598,934, incorporated herein by reference. Resilient bumpers 62 at the front of the first cart 40 cushion the impact of the first cart against the front load beam 18, during unloading of the storage rack assembly 10.

Figure 6:
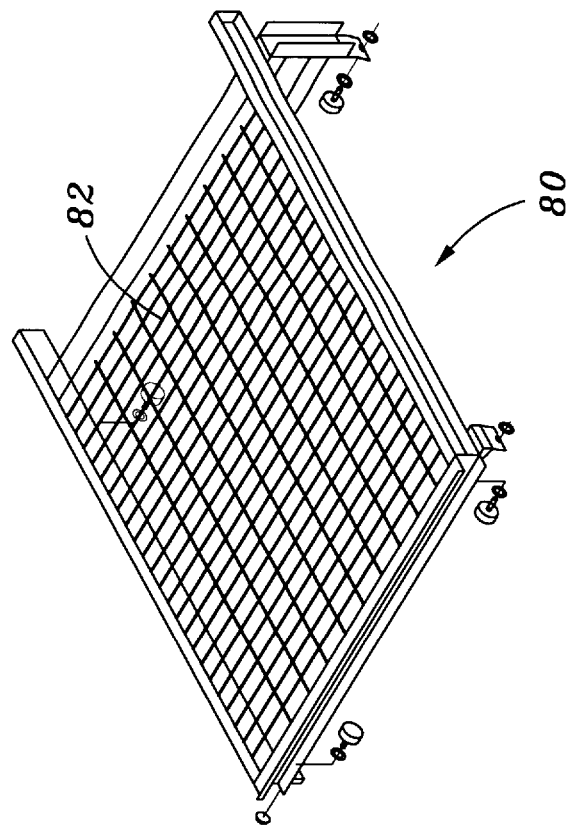
FIG. 6 is a perspective view of another cart embodiment having a wire mesh top surface.

As shown in FIG. 1, the carts are provided with a strut deck 60 formed by the cross member 50 and top surfaces of the cart side rails 46. This strut deck 60 is suitable for use with certain types of pallets and other loads. However, for some applications, strut decks are less than optimal. FIG. 5 shows a cart 70 having a solid top deck plate 72, better adapted for pallets or other loads needing more uniform support. FIG. 6 shows a similar embodiment 80 having a wire mesh top deck 82, which provides more support than the strut deck 60, yet also allows the presence of a pallet or load to be viewed from below, and water to pass through if sprinklers are activated. Other decking materials, such as a plywood sheet, wood slats, e.g., 2×4's, or corrugated steel may also be used.

The storage rack assembly 10 provides an efficient design, as only a single set of rack rails 22 is used, with the side rails 46 of one cart providing a supporting rolling surface for a subsequent cart. Consequently, costs for material and installation are reduced. Moreover, unlike the push-back cart system described in U.S. Pat. No. 5,598,934, the carts in the present storage rack system 10 can and do have interior supports, such as the cross members 50 or the solid deck plate 72, because interior clearance within the carts is not required. Similarly, stringers 55 may be provided at the front position between the rack rails 22, so that a pallet in the first position is supported side to side, in contrast to the only front to back support provided in conventional storage racks when the pallet in the first position rests only on the rack rails 22.

Thus, an improved storage rack system has been shown and described. Various changes, modifications, and substitutions of equivalents may readily be made without departing from the spirit and scope of the invention. The invention, therefore, should not be restricted, except by the following claims.

What is claimed is:

1. A push-back rack storage system, comprising:

a pair of spaced apart rack rails, each having a lower outer rail flange;

a first cart including a pair of spaced apart cart side rails having lower outside cart side rail flanges, and having a pair of front wheels mounted on first front wheel arms and a pair of back wheels mounted on first back wheel arms, with the front and back wheels rolling on the lower outer rail flanges of the rack rails and with the first front and back wheel arms extending outwardly over and downwardly alongside of the rack rails, at each side of the first cart; and a second cart including a pair of spaced apart cart side rails having lower outside cart side rail flanges, and a pair of front wheels mounted on second front wheel arms and a pair of back wheels mounted on second back wheel arms, with the front wheels rolling on the lower outside cart side rail flanges of the first cart, and with the back wheels rolling on the lower outer rail flanges of the rack rails, and with the second front and back wheel arms extending outwardly over and downwardly alongside of the rack rails, at each side of second cart, and with the second front and back wheel arms being taller than the first front and back wheel arms, so that the second cart can roll over the first cart; and a latch spring attached to one of the rack rails and to the first cart and releasable from one of said one rack rail and the first cart, to prevent the first cart from inadvertently moving when the second cart is moved, while allowing the first cart to move when a predetermined force is applied to the first cart.

2. The push-back rack storage system of claim 1 further comprising a third cart including a pair of front wheels and a pair of back wheels, with the front wheels of the third cart supported on the lower outside cart side rail flanges of the second cart and with the back wheels of the third cart supported on the lower outer rail flanges of the rack rails.

3. The push-back rack storage system of claim 1 further comprising at least one lateral cross stringer on the first cart extending between the cart side rails.

* * * * *